Sept. 28, 1965 R. S. KNAPP 3,208,808
BARBECUE UNIT
Filed June 12, 1961 5 Sheets-Sheet 4
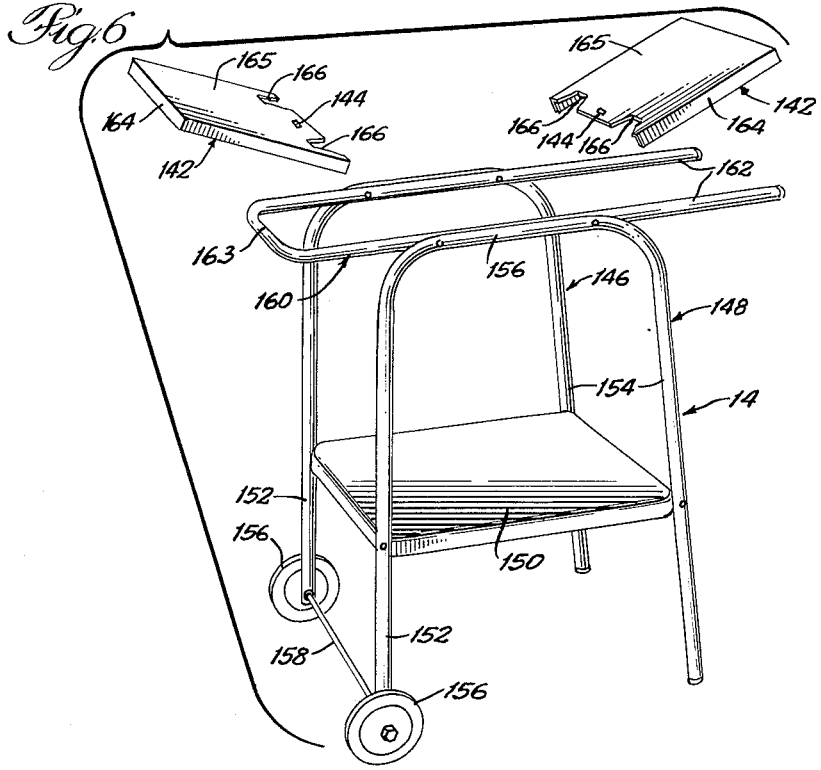
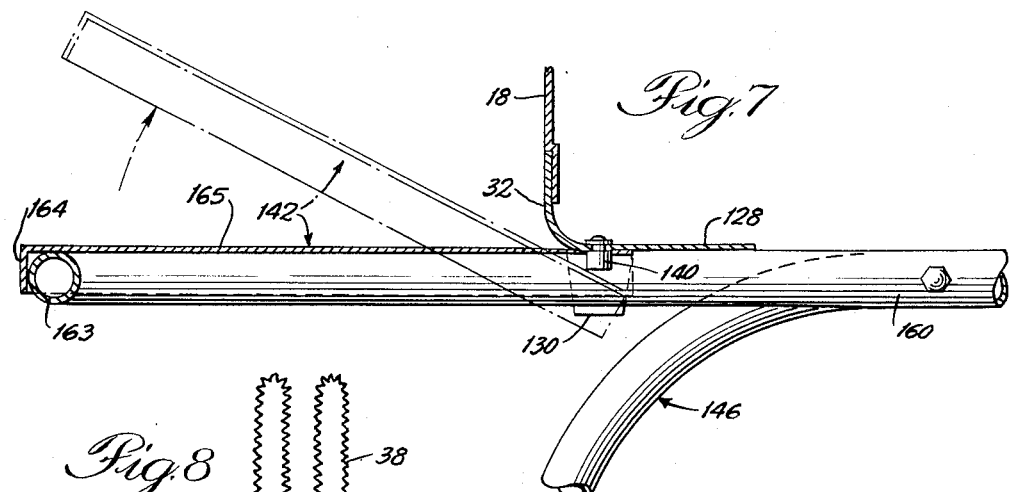
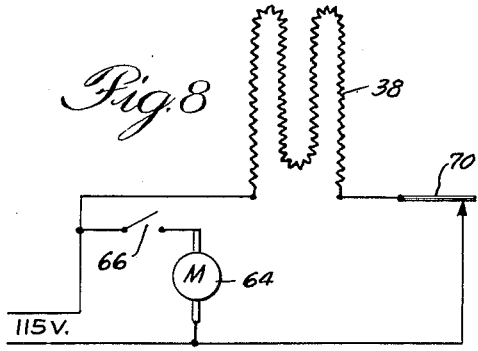
INVENTOR:
Robert S. Knapp,
BY
Bair, Freeman & Molinare
ATTORNEYS.

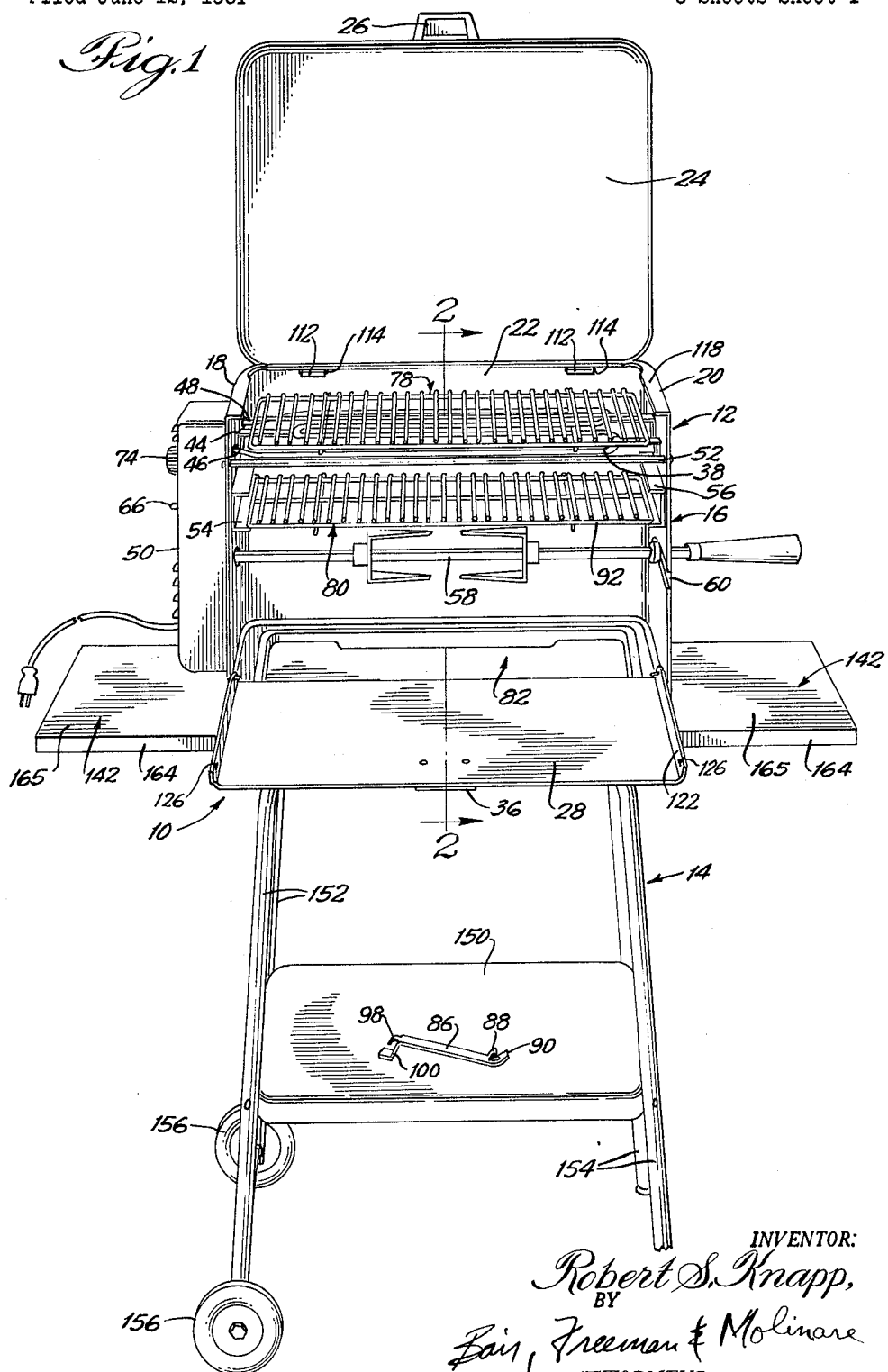

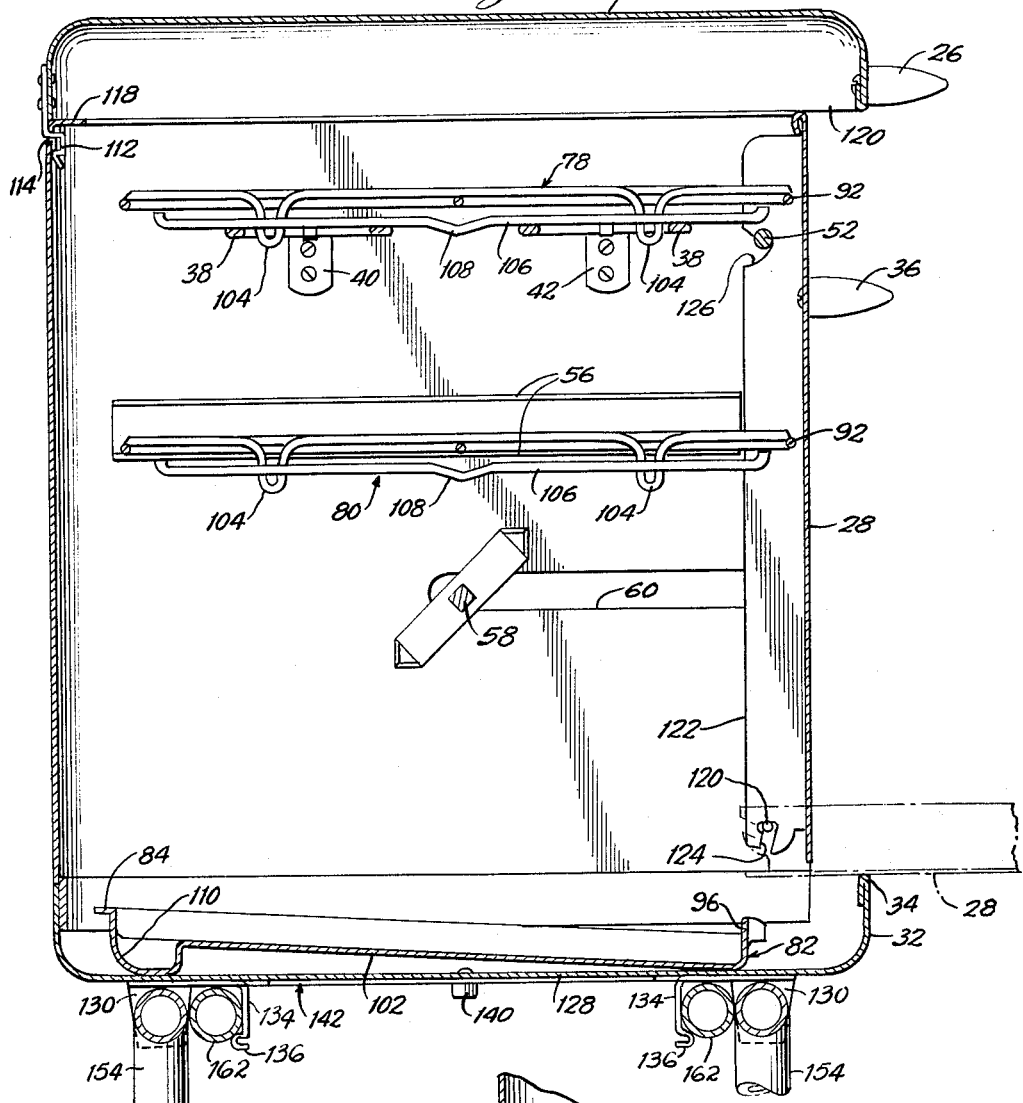
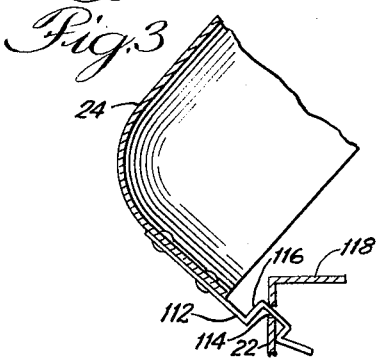
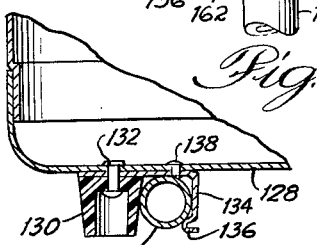

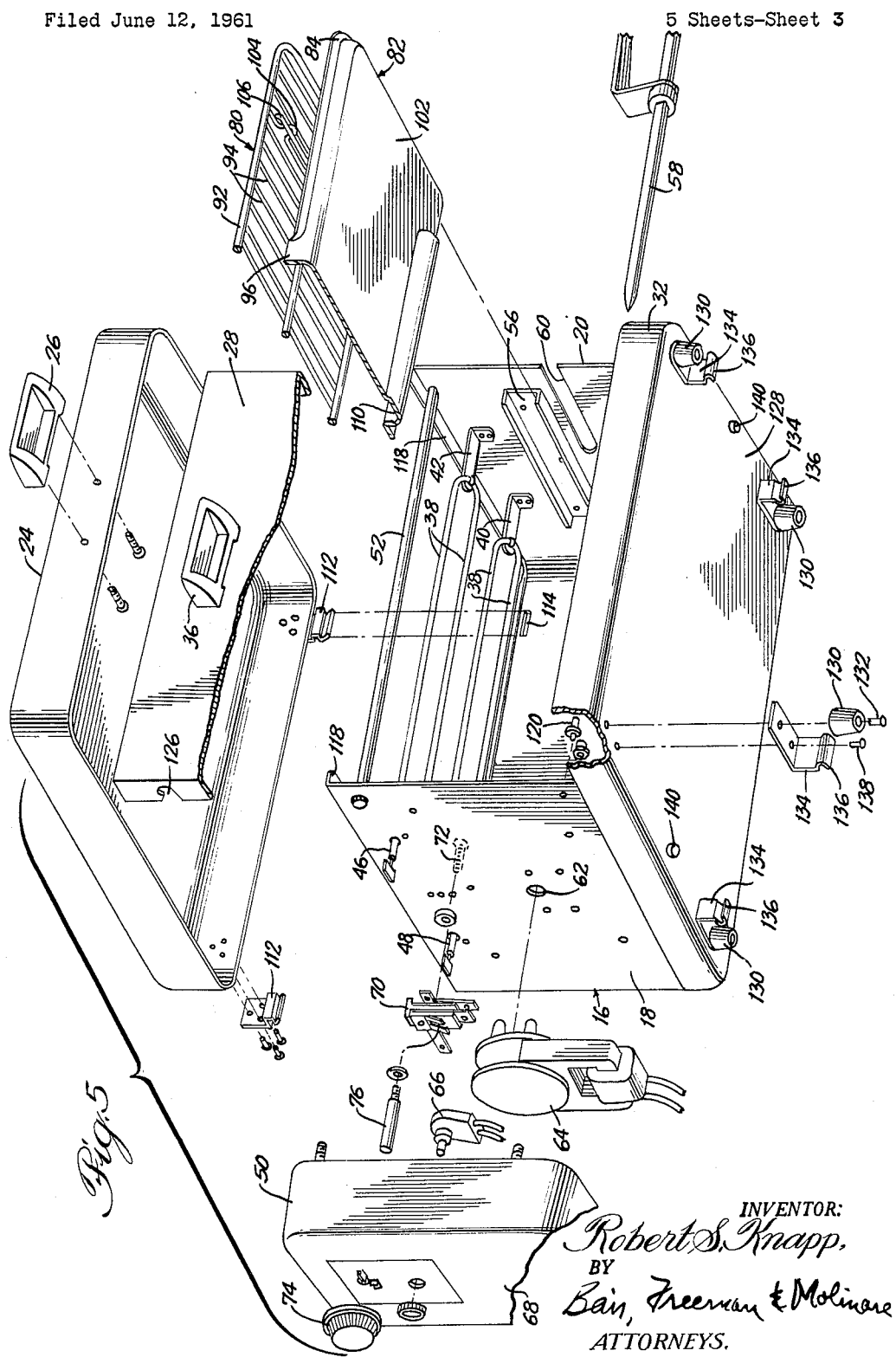

Sept. 28, 1965 R. S. KNAPP 3,208,808
BARBECUE UNIT
Filed June 12, 1961 5 Sheets-Sheet 5

INVENTOR:
Robert S. Knapp,
BY
Bair, Freeman & Molinare
ATTORNEYS.

United States Patent Office 3,208,808
Patented Sept. 28, 1965

3,208,808
BARBECUE UNIT
Robert S. Knapp, St. Louis, Mo., assignor to Knapp-Monarch Company, St. Louis, Mo., a corporation of Delaware
Filed June 12, 1961, Ser. No. 116,315
1 Claim. (Cl. 312—256)

This invention relates to a new and improved portable barbecue unit, and in particular, to a unit which enables successful outdoor electric barbecuing, and which is also adaptable for indoor use.

The portable barbecue units of the charcoal type are difficult to control, and their utility is limited. They produce objectionable smoke, flame, and dirt, and they are relatively unsuitable for indoor use.

One important object of the invention is to provide a device which successfully accomplishes outdoor electric barbecuing and, in particular, furnishes improved cooking.

Another object is to provide a portable cooking device that is useful for selective barbecuing, broiling, and/or rotisserie operation.

An additional object is to provide a portable cooking device in which food may be selectively grilled or baked, and wherein the food may be smoked when desired, and wherein the device may be used either for indoor or outdoor cooking.

Another object is to provide a versatile and adaptable oven in a barbecue unit, which is particularized by a construction that includes removable parts that permit of maintaining sanitary operations.

A particular object of this invention is to provide a barbecue unit which includes an improved roll-around stand and a cooking oven removably mounted thereon.

These and other objects, advantages and functions of the invention will be apparent from the specification and from the attached drawings illustrating preferred embodiments of the invention, in which like parts are identified by like reference symbols in each of the views, and in which:

FIGURE 1 is a front perspective view of one embodiment of the barbecue unit, with the oven lid and front door open;

FIGURE 2 is a vertical cross-sectional view thereof on an enlarged scale, taken on line 2—2 of FIGURE 1;

FIGURE 3 is a further enlarged fragmentary view similar to a portion of FIGURE 2 and illustrating the hinge mounting of the oven lid;

FIGURE 4 is an enlarged fragmentary cross-section view of the base and foot construction of the oven unit;

FIGURE 5 is an exploded perspective view of the oven unit looking up at the unit;

FIGURE 6 is an exploded perspective view of the stand for the barbecue unit, taken from the front of the unit;

FIGURE 7 is an enlarged fragmentary longitudinal sectional view of the top of the stand, illustrating the shelf mounting thereon;

FIGURE 8 is a wiring diagram for the oven unit; and

Figure 9:
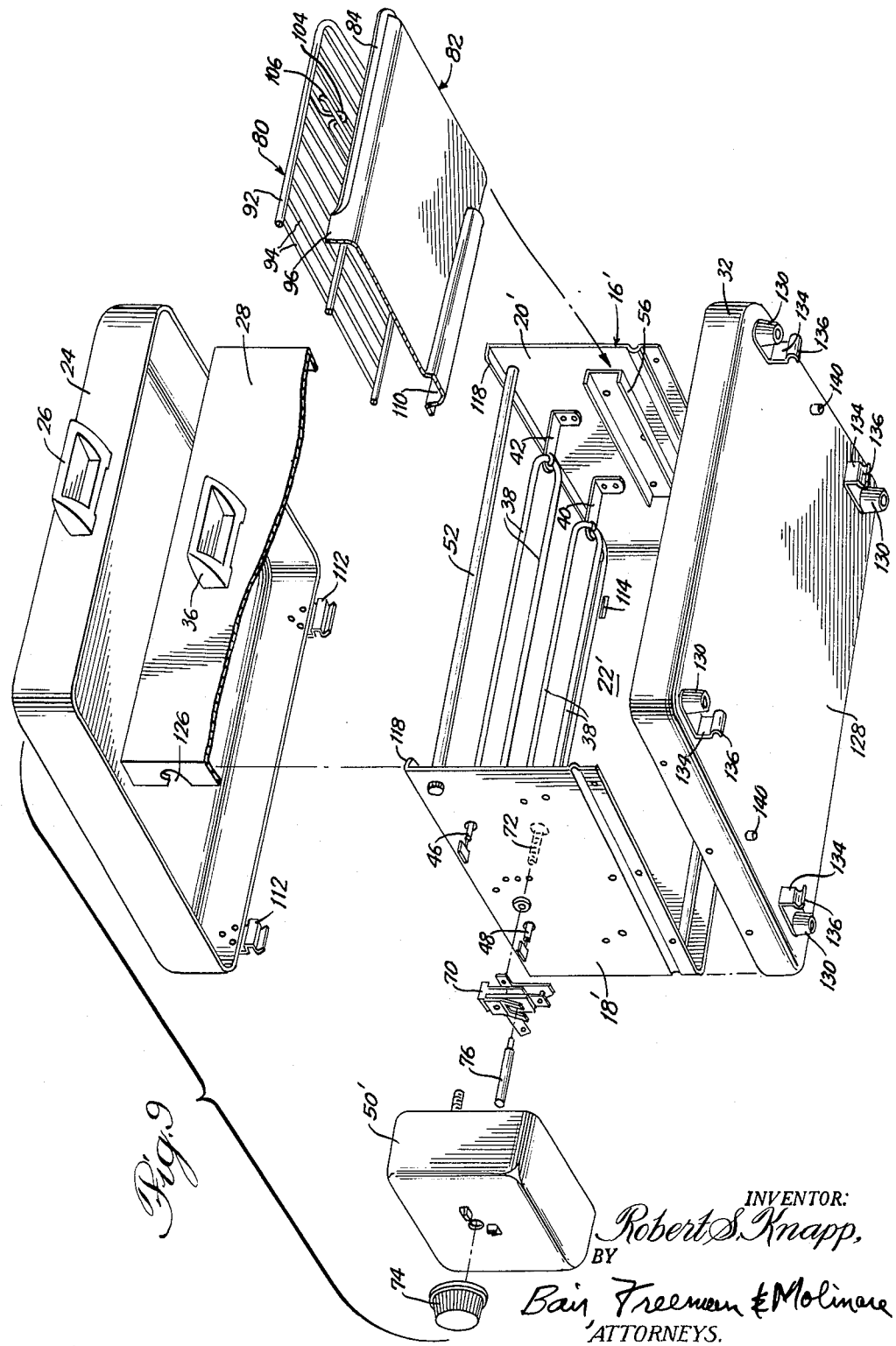
FIGURE 9 is an exploded perspective view like FIGURE 5 of another embodiment of the barbecue unit, which omits the rotisserie construction of the first embodiment.

In certain of its broader aspects, the barbecue unit of the invention includes an oven body, an electrical heating element in the body, a barbecue rack mounted over the heating element, fastening means on the body, a stand for the unit, and means on the stand for removably engaging the fastening means. In a preferred embodiment, a broiler rack is mounted under the heating element, and means are provided for interchanging the barbecue and the broiler racks. The barbecue unit may also include a rotisserie spit mounted under the heating element. Other features of the construction will appear from the description which follows.

Referring to the drawings, and particularly to FIGURE 1, the new barbecue unit 10 includes an oven unit generally indicated at 12 which is detachably secured on a portable stand 14. The oven unit includes an oven body 16 having opposite parallel side walls 18 and 20 integral with a back wall 22, the several walls being formed from one piece of metal. A lid 24 provided with an appropriate handle 26 is hingedly mounted to the top of the back wall 22. A front door 28 is hingedly mounted at the front of the side walls 18 and 20, adjacent the bases thereof. As seen in FIGURE 2, the oven body 16 is completed by a base 32 which telescopically receives the ends of the side and back walls, and extends forwardly of the front door 28, when the door is in closed position. The base 32 thereby provides, at its upper forward edge, a support ledge 34 for supporting the door 28 in the horizontal position illustrated in phantom in FIGURE 2, when the door is opened by means of its handle 36.

Referring more particularly to FIGURES 1, 2 and 5, a tubular, sheath-type electrical heating element 38 is mounted across the upper zone of the oven chamber in a horizontal plane. The heating element is sinuous in form, and it is supported by brackets 40 and 42 on the inner surface of one side wall 20, and a bracket 44 on the other wall 18, which are secured to the bends in the heating element. The terminal ends 46 and 48 of the heating element are inclined slightly toward each other and extend through openings in the side wall 18, where they are connected to the interior of a control box 50 mounted on the outer surface of the wall. A rigidifying support, or tie rod, 52 joins the side walls 18 and 20 adjacent the plane of the heating element and adjacent to the front edges of said walls.

Ledge means in the form of U-brackets or channel members 54 and 56 are mounted on the inner surfaces of the side walls 18 and 20, spaced below the heating element 38. Means are provided on the side walls below the ledge means for inserting and supporting a rotisserie spit 58. The spit is slidable into a horizontal slot 60 in one side wall 20, and the point of the spit is insertable through an opening 62 in the opposite wall 18 and into engagement with a rotisserie motor 64 located in the control box 50.

The motor is controlled by a conventional switch mechanism 66 accessible from the face 68 of the control box. The operation of the heating element 38 is regulated by a thermostat 70 which is secured in the control box 50 on the outer surface of the side wall 18 by means of a screw 72 secured to the wall. The thermostat can be manually adjusted by means of a control knob 74 mounted on the face 68 of the control box and connected to thermostat 70 by a control shaft 76.

Upper and lower barbecue racks, or grids, 78 and 80 are removably supported in the oven. In the illustration of FIGURE 1, the upper rack 78 is seated directly on the heating element 38, and it serves as a barbecue rack. The lower rack 80 is seated on the ledges 54 and 56, and it serves as a broiler rack. Preferably, as illustrated in FIGURE 5, the broiler rack 80 is seated on a drip-catching pan 82 having an upstanding rim 84 extending substantially around the pan, and the pan is supported by the rim seated on the ledge members 54 and 56. In the illustration of FIGURE 1, the pan 82 is shown resting on the base 32 of the oven body, where it serves as a drip pan beneath the spit 58.

A detachable lever-handle 86, illustrated in FIGURE 1, is provided for selectively removing the racks 78 and 80, and the pan 82. One end of handle 86 is provided with a hook 88 struck out therefrom and spaced from a flange 90 constituting the bent end of the handle for engagement of the hook with a longitudinal side wire 92 on the rack while the flange 90 abuts on the rack cross wires 94 from beneath. The opposite end of the handle is constructed for engagement with the front wall of the pan 82, and particularly with a straight wall portion 96 thereon, as best seen in FIGURE 5. A hook 98 is struck from the handle 86, and it cooperates with a spaced angle flange 100 constituting the bent end of the handle. The hook engages over the straight portion 96 on the pan, and the flange engages the side wall and the bottom wall 102 of the pan. The handle is employed to remove and/or rearrange the racks 78 and 80 and the pan 82, for purposes which will be described.

The racks 78 and 80 are specially constructed for mounting and support directly on the heating element 38 to secure them substantially in one position thereon, without relative transverse or longitudinal movement. Referring to FIGURES 2 and 5, two spaced cross wires 94' are provided with a pair of depending loops, or reverse bends, 104 in each. These bends 104 lie within the heating element between the spaced straight runs thereof, and closely adjacent the outermost of said lengths as seen in FIGURE 2, to prevent transverse movement. The bends 104 also lie closely adjacent the bights of the element 38 near the side wall 20, and closely adjacent the inwardly inclined terminal ends 46 and 48 on the heating element, to engage thereat to prevent substantial longitudinal movement. The main body of the rack is supported in spaced relation above the heating element by a pair of transverse wires 106 secured on the bottom side of the rack and having central downward bends 106 located between the inner heating element lengths.

The pan 82 has a grease trough 110 formed along the rear margin thereof. The pan is supported in an inclined position when employed as a drip pan in the manner illustrated in FIGURES 1 and 2, resting on the trough 110 at the back and on the pan bottom 102 at the front. The pan is constructed with the rim 84 for mounting on the ledges 54 and 56, as previously described, and it is also constructed for mounting on the heating element 38, where it functions as a grill. In this location, the bottom 102 of the pan is horizontal, and the grease trough 110 is disposed rearwardly of the heating element 38, to secure the pan in position. This construction and the dimensions of the pan are such that it is held against substantial transverse or longitudinal movement.

The lid 24 is chromium plated both inside and outside, to increase heat reflection for improved broiling and rotisserie operation. The lid is provided with a pair of hinge members 112 secured thereto, as illustrated particularly in FIGURE 3, which are insertable and removable through slots 114 punched in the back 22 of the oven body. The hinges include stop shoulders 116 that abut the back wall 22 on the inner surface for holding the lid in the vertically open position illustrated in FIGURE 1. When the lid is moved slightly forward from the vertical position, the hinges can be lifted out from the openings 114 with a rearward motion, without disassembling any parts.

When the lid is closed, three sides of the lid rest on an inturned ledge or rim 118 at the upper end of the walls 18, 20 and 22. The front side of the lid extends beyond the closed door 28 to provide an overhang and oven gas discharge opening 120. The lid is closed when protection from the wind is necessary, when it is desired to smoke the food, or when baking. The oven space above the heating element 38 is sufficient for smoking or baking, and the operations are properly controlled by the thermostat 70.

The front door 28 serves to prevent heat loss and decreases the time required for cooking, especially when the oven is used outside in windy weather. When in the horizontal open position illustrated in FIGURE 2, the door is employed to hold the rack 78 or 80 filled with food, when the racks are interchanged during cooking. The door is hingedly mounted on hinge pins 120 extended inwardly from the side walls 18 and 20 adjacent the lower forward corners. For this purpose, the door is provided with inturned side flanges 122 having slots 124 at their lower ends. When the door is partly open, it can be lifted up to completely disengage it from the pivot pins, for separate cleaning and easier access to the oven for cleaning it. The door flanges 122 are also provided with inclined notches 126 adjacent the upper or free end of the door, which provide latch means engaging the oven tie rod 52.

As more clearly illustrated in FIGURES 4 and 5, support means and fastening means are connected to the bottom wall 128 of the base 32 on the oven body. The support means constitute feet 130 preferably formed of plastic, which are located adjacent the four corners of the base. They are secured to the bottom wall by rivets 132 or other suitable means. A clip or hook member 134 spaced inwardly of foot 130 is also secured to the bottom wall, adjacent to each foot for cooperation therewith. The clip is in the form of an angle member having an inturned hooking flange 136. The clip base is secured on the bottom wall 128 beneath the foot 130 by the foot rivet 132, and also by a second rivet 138. The construction furnishes a snap-in mounting on the preferred tubular stand, with the stand sections being received between the foot 130 and clip 134 at each corner of the base. The feet 130 extend downwardly below the clips 134, so that the oven unit 12 may be supported on the feet when not mounted on the stand 14, without marring the supporting surface. Pins 140 also depend from the bottom wall 128 of the base, centrally on opposite sides thereof. The pins serve as locking means for side shelves 142 which are supported on the stand 14, as illustrated in FIGURES 1, 6 and 7. The shelves have openings 144 adjacent their inner edges, which receive the pins and interlock the oven unit 12 and the shelves, in the manner illustrated in FIGURE 7.

Referring especially to FIGURE 7, the stand 14 is constructed of a pair of spaced inverted U-shaped frame members 146 and 148, which are connected to each other by a lower shelf 150 suitably fastened at its corners to each of the legs of the frame. Each frame member includes tubular legs 152 and 154 joined at the top by an integral horizontal tubular cross-member 156. One leg 152 on each frame member is supported on a wheel 156 connected by an axle 158 which is journaled in the legs 152 adjacent their ends. The remaining legs 154 rest on the ground to prevent movement of the stand.

The frame members 146 and 148 are connected at their cross members 156 by a horizontal U-shaped handle member 160 aligned therewith and mounted on the inner sides thereof. The handle member includes a pair of parallel handles 162, which extend horizontally from one side of the frame, and which are connected by bight 163 which extends outwardly from the opposite side of the frame. The handle member 160 preferably is constructed of a single tubular member, and said member is adapted for engagement between the oven feet 130 and clips 134 in the manner illustrated in FIGURES 2 and 4. The cross members 156 on the frame members are disposed between the support and fastening means at each corner of the oven base, as illustrated in FIGURE 7.

Two side shelves 142 are provided in the barbecue unit, one being mounted on each side thereof. One shelf is mounted on the handles 162, with the handles enclosed by a depending peripheral side construction 164, which forms a shallow trough with the body 165 of the shelf. In addition to the openings 144 provided in the shelves for interengagment with the pins 140 on the oven base, a pair of recesses 166 on the inner margins of the shelf bodies 165 are adapted for receiving the feet 130 and clips 134 in assembling the unit.

The embodiment of the barbecue unit illustrated in FIGURE 9 is like that illustrated in the remaining views, except that the construction for the rotisserie is not included. The walls 18′, 20′, and 22′ of the oven body 16′ are appropriately modified, and in particular, are of smaller height than the corresponding numbered walls of the other embodiment. The control box 50′ is also smaller, and the motor 64 and switch 66 of the other embodiment are not included.

In the preferred embodiments illustrated, the barbecue unit is adapted for cooking 24 hamburgers at one time, with 12 hamburgers placed onto the upper rack 78 and 12 placed on the lower rack 80. When the undersides of the hamburgers on the upper rack and the upper sides of the hamburgers on the lower rack are cooked, requiring about 12 minutes, the racks with the hamburgers thereon are interchanged. This is accomplished by removing one of the racks with the handle 86 and placing it on the open door 28 while the remaining rack is shifted. The rack on the door is then lifted into the other position. The food is thus cooked on both sides without having to turn it. Similarly, when it is desired to grill on the heating element 38, the pan 82 is engaged by the handle 86 for lifting into and out of a position on the heating element. Barbecuing may take place on the upper rack 78 while broiling takes place on the lower rack 80 or while a rotisserie operation takes place on the spit 58. Alternatively, food may be grilled over the heating element while broiling or a rotisserie operation takes place. The lid 24 and the door 28 may be adjusted for wind protection, and they may be closed for smoking or baking. The unit may be rolled around on the stand 14, by lifting the handles 162. The oven unit 12 may be separated from the stand 14 and placed on another surface, either inside or outside. The shelves 142 and 150 serve for holding food and utensils while cooking.

In this manner, the invention provides a very useful and versatile electric barbecue unit useful both inside and outside. It embodies a number of advantages and functions, and is especially adapted for various types of cooking and for several combinations of cooking operations which may take place at the same time. The construction is characterized by ease and rapidity of assembly and disassembly, with no necessity for removing fastenings and the like. The oven unit is firmly supported on the stand and yet is easily removed therefrom.

It will be apparent that various changes and modifications may be made in the construction and arrangement of the parts within the spirit and scope of the invention. It is intended that such changes and modifications be included within the scope of the appended claim.

What I claim as new and desire to secure by Letters Patent of the United States is:

A barbecue unit for alternate selective use upon a flat support surface or for detachable connection onto a frame type stand for mobile use, said barbecue unit comprising a sheet metal oven body within which cooking takes place at relatively high temperatures, insulating support legs depending from said body to provide means for supporting said oven body on a support surface such as a counter top in a home or the like, clip members depending from said body and each associated with one said support leg and spaced therefrom to define spaced members for resilient gripping engagement with a frame member when the body is to be supported on a frame type stand or the like, and said support legs projecting below said oven body further than the downward extent of said clip members.

References Cited by the Examiner

UNITED STATES PATENTS

| | | | |
|---|---|---|---|
| 1,309,049 | 7/19 | Syrett | 126—9 |
| 1,414,189 | 4/22 | Kirby | 126—9 |
| 1,455,190 | 5/23 | Dodge | 99—396 |
| 1,661,819 | 3/28 | Fisher | 99—396 |
| 2,004,937 | 6/35 | Fletcher | 99—339 |
| 2,459,657 | 1/49 | Klein | 99—450 X |
| 2,466,360 | 4/49 | Bitney | 99—450 X |
| 2,729,160 | 1/56 | Pirz | 99—421 |
| 2,742,892 | 4/56 | Herzer | 99—421 X |
| 2,831,954 | 4/58 | Pirz | 99—421 X |
| 2,838,991 | 6/58 | Kleinmann et al. | 99—421 |
| 2,863,693 | 12/58 | Schwaneke | 126—9 |
| 2,898,437 | 8/59 | McFarland | 99—421 X |
| 2,932,479 | 4/60 | Leach | 248—129 |
| 2,956,497 | 10/60 | Bernstein | 99—421 |
| 3,005,611 | 10/61 | Terry | 248—129 |

FOREIGN PATENTS 534,593   10/55   Italy.

ROBERT E. PULFREY, *Primary Examiner.*

JEROME SCHNALL, LAWRENCE CHARLES,
*Examiners.*